US012682530B2

(12) United States Patent
Moon et al.

(10) Patent No.: US 12,682,530 B2
(45) Date of Patent: Jul. 14, 2026

(54) ELECTRONIC DEVICE AND METHOD FOR MANAGING INFORMATION FOR CREATING AVATAR OF ELECTRONIC DEVICE

(71) Applicant: Samsung Electronics Co., Ltd., Suwon-si (KR)

(72) Inventors: Jongbo Moon, Suwon-si (KR); Byunghyun Ahn, Suwon-si (KR); Jeehae Kim, Suwon-si (KR); Jongpil Park, Suwon-si (KR); Sangwon Chae, Suwon-si (KR); Chanmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 18/327,359

(22) Filed: Jun. 1, 2023

(65) Prior Publication Data

US 2023/0306668 A1     Sep. 28, 2023

Related U.S. Application Data

(63) Continuation of application No. PCT/KR2021/018501, filed on Dec. 8, 2021.

(30) Foreign Application Priority Data

Jan. 8, 2021     (KR) ........................ 10-2021-0002804

(51) Int. Cl.
*G06T 13/40* (2011.01)
*G06V 40/16* (2022.01)
(52) U.S. Cl.
CPC ............ *G06T 13/40* (2013.01); *G06V 40/168* (2022.01)

(58) Field of Classification Search
CPC .............................. G06T 13/40; G06V 40/168
See application file for complete search history.

(56) References Cited

U.S. PATENT DOCUMENTS 6,272,231 B1 *   8/2001   Maurer ................ G06V 10/449
                                                          382/209
6,714,661 B2 *   3/2004   Buddenmeier ........... G06T 7/97
                                                          382/209
(Continued)

FOREIGN PATENT DOCUMENTS

EP          3654290 A1      5/2020
JP       2020136921 A       8/2020
(Continued)

OTHER PUBLICATIONS

Korean Office Action dated Oct. 31, 2025 for KR Application No. 10-2021-0002804.

*Primary Examiner* — Charles L Beard
(74) *Attorney, Agent, or Firm* — Nixon Vanderhye P.C.

(57)     ABSTRACT

A method for managing information for creating an avatar, and an electronic device thereof. The electronic device may include a communication module, a display, a memory, and at least one processor. The at least one processor may, in response to an avatar creation request, recognize an image displayed on the display and create an avatar on the basis of a recognition result of the image and mapping information. The at least one processor may, when the mapping information needs to be updated, transmit, to a designated server, characteristic information related to a user of the electronic device and receive, from the server, mapping information corresponding to the characteristic information related to the user. Various other embodiments are also possible.

11 Claims, 8 Drawing Sheets

(56)  References Cited

U.S. PATENT DOCUMENTS

| | | | | |
|---|---|---|---|---|
| 7,227,976 B1* | 6/2007 | Jung | G06V 40/161 | |
| | | | 382/117 | |
| 7,912,246 B1* | 3/2011 | Moon | G06F 18/24 | |
| | | | 382/118 | |
| 9,104,908 B1* | 8/2015 | Rogers | G06V 40/176 | |
| 9,111,134 B1* | 8/2015 | Rogers | G06V 10/7557 | |
| 9,349,414 B1* | 5/2016 | Furment | H04N 23/611 | |
| 9,386,268 B2* | 7/2016 | Tong | G06V 40/168 | |
| 9,652,134 B2* | 5/2017 | Goossens | G06Q 50/01 | |
| 10,210,648 B2* | 2/2019 | Stoyles | G06T 13/40 | |
| 10,248,842 B1* | 4/2019 | Bardagjy | G06V 10/60 | |
| 10,362,219 B2* | 7/2019 | Wilson | H04N 23/64 | |
| 10,452,896 B1* | 10/2019 | Weise | G06T 13/40 | |
| 10,467,793 B2* | 11/2019 | Viklund | G06V 40/161 | |
| 10,572,720 B2* | 2/2020 | Hu | G06T 7/55 | |
| 10,659,405 B1* | 5/2020 | Chang | G06F 3/0482 | |
| 10,832,589 B1* | 11/2020 | Anzalone | G09B 19/00 | |
| 10,846,517 B1* | 11/2020 | Bulusu | G06V 40/161 | |
| 11,417,053 B1* | 8/2022 | Yang | G06T 15/205 | |
| 11,481,988 B2* | 10/2022 | Van Os | G06T 13/40 | |
| 11,574,430 B2* | 2/2023 | Kwon | G06T 3/00 | |
| 11,670,031 B2* | 6/2023 | Prasad | G06V 40/171 | |
| | | | 345/473 | |
| 11,841,935 B2* | 12/2023 | Li | H04L 63/08 | |
| 11,875,439 B2* | 1/2024 | Cao | G06T 13/20 | |
| 11,921,998 B2* | 3/2024 | Triverio | G06T 19/20 | |
| 12,106,413 B1* | 10/2024 | Mason | G06T 13/40 | |
| 12,112,573 B2* | 10/2024 | Tay | G06V 40/171 | |
| 12,125,130 B1* | 10/2024 | Mulliken | H04N 7/157 | |
| 12,190,576 B2* | 1/2025 | Lee | H04N 23/632 | |
| 12,254,548 B1* | 3/2025 | Datta | G06V 40/176 | |
| 2004/0109584 A1* | 6/2004 | Lestideau | G06V 40/161 | |
| | | | 382/103 | |
| 2005/0273331 A1* | 12/2005 | Lu | G06V 40/171 | |
| | | | 704/E21.02 | |
| 2007/0047775 A1* | 3/2007 | Okubo | G06V 40/165 | |
| | | | 382/118 | |
| 2007/0115350 A1* | 5/2007 | Currivan | H04N 7/147 | |
| | | | 348/14.08 | |
| 2007/0139512 A1* | 6/2007 | Hada | H04N 7/147 | |
| | | | 348/E7.081 | |
| 2007/0260984 A1* | 11/2007 | Marks | A63F 13/65 | |
| | | | 715/706 | |
| 2009/0087035 A1* | 4/2009 | Wen | G06V 40/168 | |
| | | | 382/118 | |
| 2009/0153569 A1* | 6/2009 | Park | G06T 7/277 | |
| | | | 345/474 | |
| 2009/0202114 A1* | 8/2009 | Morin | A63F 13/12 | |
| | | | 382/118 | |
| 2009/0285456 A1* | 11/2009 | Moon | G06V 40/176 | |
| | | | 382/118 | |
| 2009/0315893 A1 | 12/2009 | Smith et al. | | |
| 2011/0115786 A1* | 5/2011 | Mochizuki | G06T 11/10 | |
| | | | 345/419 | |
| 2011/0296324 A1* | 12/2011 | Goossens | G06F 3/04845 | |
| | | | 715/763 | |
| 2012/0169740 A1* | 7/2012 | Han | A63F 13/211 | |
| | | | 345/474 | |
| 2012/0309520 A1 | 12/2012 | Evertt et al. | | |
| 2013/0088513 A1* | 4/2013 | Deng | G06T 11/60 | |
| | | | 345/629 | |
| 2013/0100140 A1* | 4/2013 | Ye | G06T 13/40 | |
| | | | 345/473 | |
| 2013/0215112 A1* | 8/2013 | Ho | G06F 3/011 | |
| | | | 345/420 | |
| 2013/0235045 A1* | 9/2013 | Corazza | G06V 40/172 | |
| | | | 345/473 | |
| 2013/0257876 A1* | 10/2013 | Davis | G06T 13/40 | |
| | | | 345/473 | |
| 2013/0257877 A1* | 10/2013 | Davis | G06N 3/006 | |
| | | | 345/473 | |
| 2013/0282808 A1* | 10/2013 | Sadanandan | G06Q 10/10 | |
| | | | 709/204 | |

| | | | | |
|---|---|---|---|---|
| 2013/0286161 A1* | 10/2013 | Lv | G06T 7/55 | |
| | | | 348/46 | |
| 2013/0314405 A1* | 11/2013 | Lucey | G06T 13/40 | |
| | | | 345/419 | |
| 2014/0016823 A1* | 1/2014 | Ye | G06T 19/20 | |
| | | | 382/103 | |
| 2014/0022249 A1* | 1/2014 | Ye | G06T 19/20 | |
| | | | 345/420 | |
| 2014/0035934 A1* | 2/2014 | Du | G06T 17/20 | |
| | | | 345/474 | |
| 2014/0055554 A1* | 2/2014 | Du | G06V 40/175 | |
| | | | 348/14.07 | |
| 2014/0085293 A1* | 3/2014 | Konoplev | A63F 13/55 | |
| | | | 345/419 | |
| 2014/0152758 A1* | 6/2014 | Tong | H04M 1/72439 | |
| | | | 348/14.02 | |
| 2014/0160149 A1* | 6/2014 | Blackstock | A63F 13/79 | |
| | | | 345/619 | |
| 2014/0176662 A1* | 6/2014 | Goodman | H04W 4/21 | |
| | | | 348/14.07 | |
| 2014/0198121 A1* | 7/2014 | Tong | G06T 11/60 | |
| | | | 345/581 | |
| 2014/0218371 A1* | 8/2014 | Du | G06T 13/40 | |
| | | | 345/473 | |
| 2014/0267413 A1* | 9/2014 | Du | G06V 40/171 | |
| | | | 345/633 | |
| 2015/0035825 A1* | 2/2015 | Zhou | G06T 7/251 | |
| | | | 345/419 | |
| 2015/0123967 A1* | 5/2015 | Quinn | G06T 7/60 | |
| | | | 345/419 | |
| 2015/0213604 A1* | 7/2015 | Li | G06T 13/80 | |
| | | | 345/473 | |
| 2015/0312523 A1* | 10/2015 | Li | G06F 3/0488 | |
| | | | 348/14.03 | |
| 2015/0325029 A1* | 11/2015 | Li | G06T 1/0007 | |
| | | | 382/103 | |
| 2015/0381939 A1* | 12/2015 | Cunico | G06T 7/20 | |
| | | | 348/14.07 | |
| 2016/0006987 A1* | 1/2016 | Li | G06V 40/174 | |
| | | | 348/14.03 | |
| 2016/0093085 A1 | 3/2016 | Ray et al. | | |
| 2016/0180391 A1* | 6/2016 | Zabaneh | G06F 16/9535 | |
| | | | 705/14.58 | |
| 2016/0217601 A1* | 7/2016 | Tsuda | A63F 13/655 | |
| 2016/0292901 A1* | 10/2016 | Li | G06V 40/28 | |
| 2016/0328875 A1* | 11/2016 | Fang | G06V 40/176 | |
| 2016/0379041 A1* | 12/2016 | Rhee | G06V 40/165 | |
| | | | 382/118 | |
| 2017/0069124 A1* | 3/2017 | Tong | G06T 17/20 | |
| 2017/0178287 A1* | 6/2017 | Anderson | G06V 40/174 | |
| 2017/0323374 A1* | 11/2017 | Park | G06Q 30/0643 | |
| 2017/0352178 A1* | 12/2017 | Katz | G06V 40/168 | |
| 2017/0358117 A1* | 12/2017 | Goossens | H04L 51/10 | |
| 2018/0047200 A1* | 2/2018 | O'Hara | G06T 13/40 | |
| 2018/0091732 A1* | 3/2018 | Wilson | G06F 3/0488 | |
| 2018/0158230 A1* | 6/2018 | Yan | G06V 40/168 | |
| 2018/0165862 A1* | 6/2018 | Sawaki | G06T 13/40 | |
| 2018/0253897 A1* | 9/2018 | Satake | A63F 13/215 | |
| 2018/0268595 A1* | 9/2018 | Sarna | G06T 13/80 | |
| 2018/0300927 A1* | 10/2018 | Hushchyn | G06V 40/167 | |
| 2018/0314881 A1* | 11/2018 | Sud | A61B 5/6803 | |
| 2018/0316734 A1* | 11/2018 | Nakabo | H04L 65/4053 | |
| 2018/0322681 A1* | 11/2018 | Inomata | A63F 13/211 | |
| 2018/0336715 A1* | 11/2018 | Rickwald | G06T 13/40 | |
| 2019/0095775 A1* | 3/2019 | Lembersky | G06N 3/006 | |
| 2019/0130628 A1* | 5/2019 | Cao | G06T 13/205 | |
| 2019/0147642 A1* | 5/2019 | Cole | G06V 20/64 | |
| | | | 345/419 | |
| 2019/0266775 A1* | 8/2019 | Lee | G06F 3/0346 | |
| 2019/0266807 A1* | 8/2019 | Lee | G06T 13/40 | |
| 2019/0279393 A1* | 9/2019 | Ciuc | G06T 13/40 | |
| 2019/0340419 A1* | 11/2019 | Milman | G06T 15/02 | |
| 2020/0020173 A1* | 1/2020 | Sharif | G06T 19/20 | |
| 2020/0051304 A1* | 2/2020 | Choi | G06F 3/011 | |
| 2020/0051341 A1* | 2/2020 | Lee | G06V 40/168 | |
| 2020/0134898 A1* | 4/2020 | Sheth | G06T 13/40 | |
| 2020/0166991 A1* | 5/2020 | Aggarwal | G06F 3/167 | |

(56) References Cited

U.S. PATENT DOCUMENTS

| | | | |
|---|---|---|---|
| 2020/0202604 A1* | 6/2020 | Otani | G06T 13/40 |
| 2020/0226811 A1* | 7/2020 | Kim | A63F 13/55 |
| 2020/0234481 A1* | 7/2020 | Scapel | G06T 13/40 |
| 2020/0312002 A1* | 10/2020 | Comploi | G06V 40/172 |
| 2020/0327312 A1* | 10/2020 | Im | G06V 40/174 |
| 2020/0334853 A1* | 10/2020 | Ciuc | G06T 7/246 |
| 2020/0402304 A1* | 12/2020 | Hwang | G06T 7/168 |
| 2021/0005003 A1* | 1/2021 | Chong | G06T 17/205 |
| 2021/0027513 A1* | 1/2021 | Choi | G06T 13/80 |
| 2021/0056747 A1* | 2/2021 | Hefny | H04N 7/147 |
| 2021/0264563 A1* | 8/2021 | Shen | A63F 13/92 |
| 2021/0295579 A1* | 9/2021 | Davis | G06F 30/20 |
| 2021/0304452 A1* | 9/2021 | Lee | H04L 51/10 |
| 2021/0312167 A1* | 10/2021 | Shirai | G06F 3/16 |
| 2021/0365749 A1* | 11/2021 | Liu | G06V 40/168 |
| 2022/0005246 A1* | 1/2022 | Nadimpalli | G06T 13/40 |
| 2022/0028149 A1* | 1/2022 | Prasad | G06T 15/205 |
| 2022/0036617 A1* | 2/2022 | Biswas | G06N 3/088 |
| 2022/0084168 A1* | 3/2022 | Lee | G06T 19/20 |
| 2022/0148266 A1* | 5/2022 | Kim | G06V 40/171 |
| 2022/0215608 A1* | 7/2022 | Comploi | G06T 17/20 |
| 2022/0222892 A1* | 7/2022 | Luo | G06T 15/506 |
| 2022/0254188 A1* | 8/2022 | Vaggalis | G06T 11/10 |
| 2022/0292774 A1* | 9/2022 | Yang | G06T 17/00 |
| 2022/0292795 A1* | 9/2022 | Chen | G06T 7/149 |
| 2022/0319088 A1* | 10/2022 | Wedig | G06V 40/174 |
| 2022/0343506 A1* | 10/2022 | Otsuka | G16H 30/40 |
| 2022/0358719 A1* | 11/2022 | Cao | G06T 7/73 |
| 2022/0375258 A1* | 11/2022 | Hua | G06V 40/171 |
| 2023/0009287 A1* | 1/2023 | Won | G06T 11/60 |
| 2023/0080031 A1* | 3/2023 | Zhang | G06V 10/82 |
| | | | 382/118 |
| 2023/0087879 A1* | 3/2023 | An | G06T 7/246 |
| | | | 345/474 |
| 2023/0093370 A1* | 3/2023 | Battaglia | G06F 8/65 |
| | | | 717/170 |
| 2023/0115028 A1* | 4/2023 | Arunachala | A63F 13/67 |
| | | | 345/619 |
| 2023/0119330 A1* | 4/2023 | Macleod | G06V 40/168 |
| | | | 345/473 |
| 2023/0127495 A1* | 4/2023 | Chen | G06T 13/80 |
| | | | 345/473 |
| 2023/0130535 A1* | 4/2023 | Ma | G06T 13/40 |
| | | | 345/474 |
| 2023/0140146 A1* | 5/2023 | Ito | G06T 5/77 |
| | | | 345/581 |
| 2023/0206531 A1* | 6/2023 | Agura | G06T 13/40 |
| | | | 345/473 |
| 2023/0230305 A1* | 7/2023 | Sheng | G06V 40/23 |
| | | | 345/473 |
| 2023/0230320 A1* | 7/2023 | Cho | G06V 40/168 |
| | | | 345/419 |
| 2023/0237630 A1* | 7/2023 | Zhu | G06T 5/50 |
| 2023/0260184 A1* | 8/2023 | Chen | G06V 10/774 |
| | | | 345/423 |
| 2023/0306792 A1* | 9/2023 | Vemulapalli | G06V 40/174 |
| 2023/0316810 A1* | 10/2023 | Haeberling | G06V 40/174 |
| | | | 382/118 |
| 2023/0343053 A1* | 10/2023 | Scapel | G06T 11/60 |
| 2023/0410378 A1* | 12/2023 | Karmi | G06V 40/174 |
| 2023/0419580 A1* | 12/2023 | Narayan | G06T 13/40 |
| 2024/0020902 A1* | 1/2024 | Karklinsky | G06Q 10/40 |
| 2024/0029331 A1* | 1/2024 | Ocampo | G06V 40/168 |
| 2024/0046536 A1* | 2/2024 | Prasad | G06T 11/40 |
| 2024/0062445 A1* | 2/2024 | Sutton | G06V 40/168 |
| 2024/0062467 A1* | 2/2024 | Sarkis | G06V 10/82 |
| 2024/0070956 A1* | 2/2024 | Liu | G06T 11/60 |
| 2024/0119671 A1* | 4/2024 | Liu | G06T 7/60 |
| 2024/0129437 A1* | 4/2024 | Zhang | H04N 7/147 |
| 2024/0135621 A1* | 4/2024 | Sang | G06V 10/82 |
| 2024/0177389 A1* | 5/2024 | Park | G06T 19/00 |
| 2024/0185494 A1* | 6/2024 | Liu | G06N 3/08 |
| 2024/0193836 A1* | 6/2024 | Stemple | G06V 40/168 |
| 2024/0193838 A1* | 6/2024 | Stemple | H04L 67/306 |
| 2024/0205372 A1* | 6/2024 | Bhat | H04N 7/15 |
| 2024/0221238 A1* | 7/2024 | Abe | G06T 11/00 |
| 2024/0221365 A1* | 7/2024 | Phung | G06V 10/774 |
| 2024/0242414 A1* | 7/2024 | Oh | G06T 15/04 |
| 2024/0242455 A1* | 7/2024 | Peris | G06T 19/20 |
| 2024/0242539 A1* | 7/2024 | Su | G06V 40/176 |
| 2024/0256033 A1* | 8/2024 | Godo | G06T 5/70 |
| 2024/0257499 A1* | 8/2024 | Wang | G06T 7/246 |
| 2024/0265612 A1* | 8/2024 | Lee | G06T 13/40 |
| 2024/0290022 A1* | 8/2024 | Li | G06N 3/0895 |
| 2024/0290025 A1* | 8/2024 | Zhang | G06T 17/20 |
| 2024/0312093 A1* | 9/2024 | Ballagas | G10L 21/10 |
| 2024/0325928 A1* | 10/2024 | Blackstock | G06T 11/00 |
| 2024/0331252 A1* | 10/2024 | Ju | G06T 13/40 |
| 2024/0404160 A1* | 12/2024 | Geertsen | G06T 13/40 |
| 2025/0008290 A1* | 1/2025 | Welch | G10K 15/02 |
| 2025/0014470 A1* | 1/2025 | Liu | G06V 40/176 |
| 2025/0061634 A1* | 2/2025 | Huang | G06T 13/40 |
| 2025/0061649 A1* | 2/2025 | Li | G06T 17/00 |
| 2025/0086871 A1* | 3/2025 | Baszucki | G06T 7/74 |
| 2025/0086873 A1* | 3/2025 | Baszucki | G06T 13/40 |
| 2025/0086970 A1* | 3/2025 | Lee | G06V 20/20 |
| 2025/0095259 A1* | 3/2025 | Cheng | G06T 13/40 |
| 2025/0131669 A1* | 4/2025 | Carter | G06T 17/20 |
| 2025/0252640 A1* | 8/2025 | Petikam | G06T 15/02 |
| 2025/0391079 A1* | 12/2025 | Lee | G06F 3/015 |

FOREIGN PATENT DOCUMENTS

| | | |
|---|---|---|
| KR | 2019-0101832 A | 9/2019 |
| KR | 20200017266 A | 2/2020 |
| KR | 20200088187 A | 7/2020 |
| KR | 20200109634 A | 9/2020 |
| KR | 20220049689 A | 4/2022 |

* cited by examiner

200

ELECTRONIC DEVICE AND METHOD FOR MANAGING INFORMATION FOR CREATING AVATAR OF ELECTRONIC DEVICE

CROSS-REFERENCE TO RELATED APPLICATIONS

This application is a continuation of International Application No. PCT/KR2021/018501 filed on Dec. 8, 2021, designating the United States, and claiming priority to Korean Patent Application No. 10-2021-0002804 filed on Jan. 8, 2021, in the Korean Intellectual Property Office, the disclosures of all of which are hereby incorporated by reference herein in their entireties.

BACKGROUND

Field

Various example embodiments relate to an electronic device and/or a method for managing information for avatar generation thereby.

Description of Related Art

An electronic device (e.g., a mobile terminal, a smartphone, or a wearable terminal) may provide various functions. For example, the electronic device may provide a photographing function, a music playback function, a navigation function, a call function, a short-range wireless communication (e.g., Bluetooth, Wi-Fi, or near field communication (NFC)) function, an electronic payment function, or a voice recognition function.

The electronic device may provide, for example, an avatar generation function (or application). The avatar generation function may analyze an image displayed on a screen to recognize feature information of an object (e.g., a person) included in the image, select one of base models stored in the electronic device based on the recognized feature information, select assets corresponding to each component (e.g., hairstyle, eyebrows, eyes, nose, mouth, beard, ears, and/or accessories), and arrange and render each selected asset on the selected base model so as to generate an avatar similar to the object (e.g., a person) included in the image.

The electronic device (or an avatar generating application) may use various modules included in the electronic device to generate an avatar. For example, the electronic device may generate an avatar by using a face recognition module configured to recognize a human face from an image, a configuration module configured to configure a face of an avatar based on a result of the recognition, and/or a rendering module configured to generate the face of the avatar by rendering the configured face.

SUMMARY

In case that some of the various modules used for avatar generation are updated, the electronic device may have a problem in compatibility with other modules. For example, in case that the face recognition module is updated and a recognizable component is added or changed, assets corresponding to the added or changed component do not exist in the electronic device, and thus a problem in which the face configuration module may not configure the face of an avatar or improper assets configure the avatar face may occur. In order to solve the compatibility problem, an inconvenience in which the electronic device should update modules used for avatar generation together (e.g., update all of avatar generation applications) may exist.

Various example embodiments may provide an electronic device which causes a server side to manage data (e.g., mapping information) for avatar generation, and a method for managing information for avatar generation thereby.

Various example embodiments may provide an electronic device configured to provide data for avatar generation to a user by reflecting the user's characteristics, and a method for managing information for avatar generation thereby.

An electronic device according to various example embodiments may include, for example, a communication module comprising communication circuitry, a display, a memory configured to store mapping information for avatar generation, and at least one processor operatively connected, directly or indirectly, to the communication module, the display, and the memory, wherein the least one processor may be configured to, in response to an avatar generation request, recognize an image displayed on the display, and generate an avatar based on a result of the recognition of the image and the mapping information, wherein the at least one processor may be configured to, in case that the mapping information needs to be updated, transmit characteristic information regarding a user of the electronic device to a designated server through the communication module, and receive, from the server, mapping information corresponding to the characteristic information regarding the user.

A method for managing information for avatar generation by an electronic device according to various example embodiments may include, for example, recognizing an image displayed on a display in response to a request for avatar generation, identifying whether mapping information for the avatar generation needs to be updated, transmitting characteristic information regarding a user of the electronic device to a designated server in case that the mapping information needs to be updated, receiving, from the server, updated mapping information corresponding to the characteristic information regarding the user, and generating an avatar based on a result of the recognition of the image and the updated mapping information.

An electronic device according to various example embodiments may include, for example, a communication module comprising communication circuitry, a memory configured to store mapping information including a mapping table, in which feature information of an object is mapped to an asset, and the asset, and at least one processor operatively connected, directly or indirectly, to the communication module and the memory, wherein the least one processor may be configured to receive at least one of a version of a mapping table included in an external electronic device or characteristic information of a user of the external electronic device through the communication module, identify whether the mapping table included in the external electronic device is updated, based on at least one of the received mapping table version or the user characteristic information, and in case that the mapping table included in the external electronic device needs to be updated, transmit an updated mapping table to the external electronic device.

Various example embodiments may cause a server side to manage data for avatar generation (e.g., mapping information), so as to easily update data, and generate an avatar (e.g., which resembles an object (e.g., a person) recognized from an image) more accurately based on the updated data.

Various example embodiments may reflect updates of some modules quickly (e.g., in real time) through updating mapping information, rather than updating the entire application in order to update some of the configurations (e.g., modules) required for avatar generation, so as to quickly reflect the needs of users.

Various example embodiments may provide data for avatar generation differently for each situation (e.g., electronic device information (e.g., a model name), country information, event information, avatar generation history information, and user account information). Accordingly, various example embodiments may generate an avatar more suitable for a situation.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Figure 1:
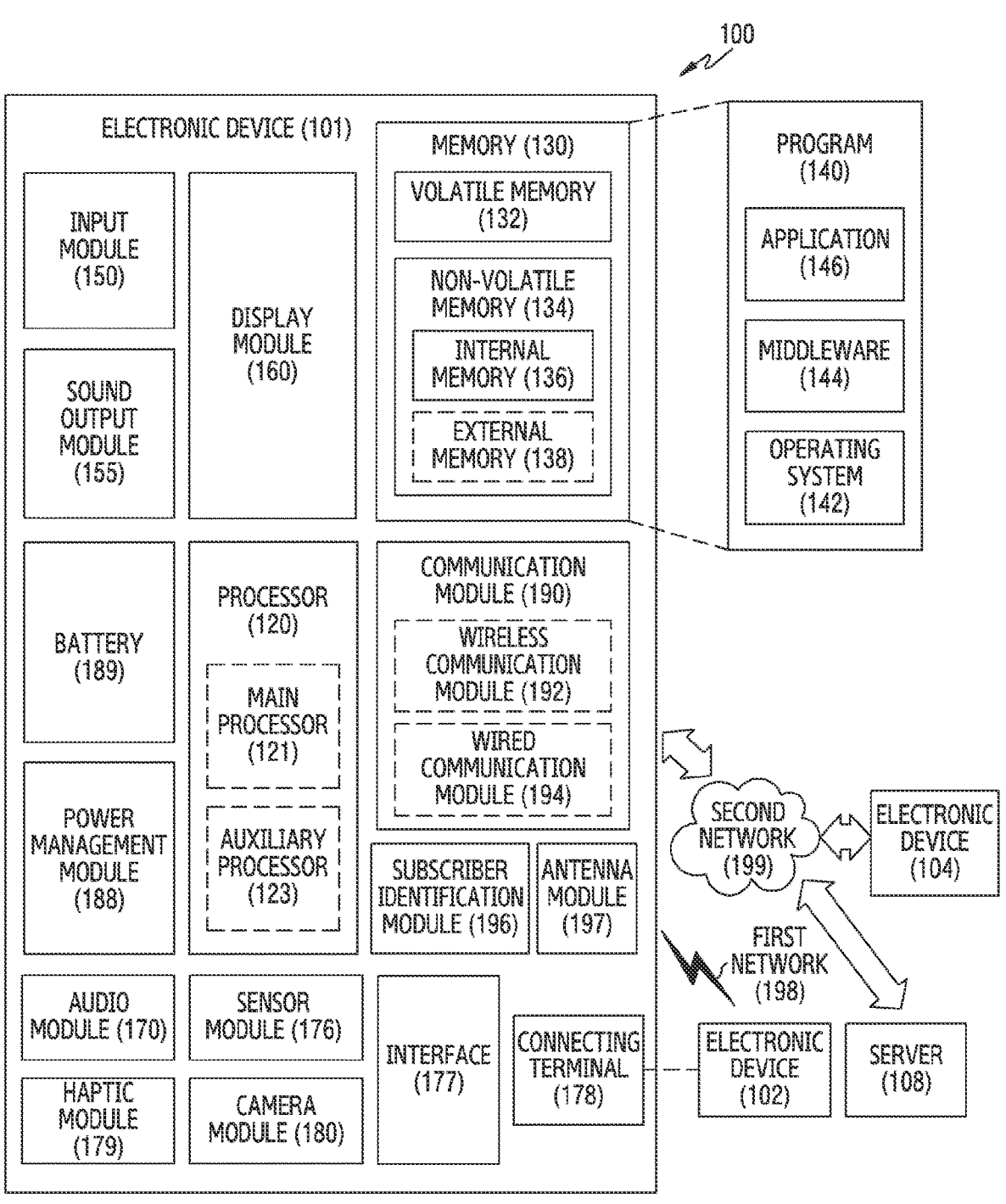
FIG. 1 is a block diagram of an electronic device in a network environment according to various example embodiments.

Hereinafter, various example embodiments will be described with reference to the accompanying drawings. In this document, specific embodiments are illustrated in the drawings and a detailed description relating thereto is described, but this is not intended to limit the various example embodiments to a specific form. For example, it will be apparent to a person skilled in the art to which the disclosure pertains that the example embodiments may be variously changed.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190, which may comprise communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192, which may comprise communication circuitry, may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Prior to a detailed description, various example embodiments will be described below with reference to an example of generating an avatar of a person. However, various example embodiments may also be applied to generating an avatar of an animal and/or a plant and/or generating a shape of an object.

Figure 2:
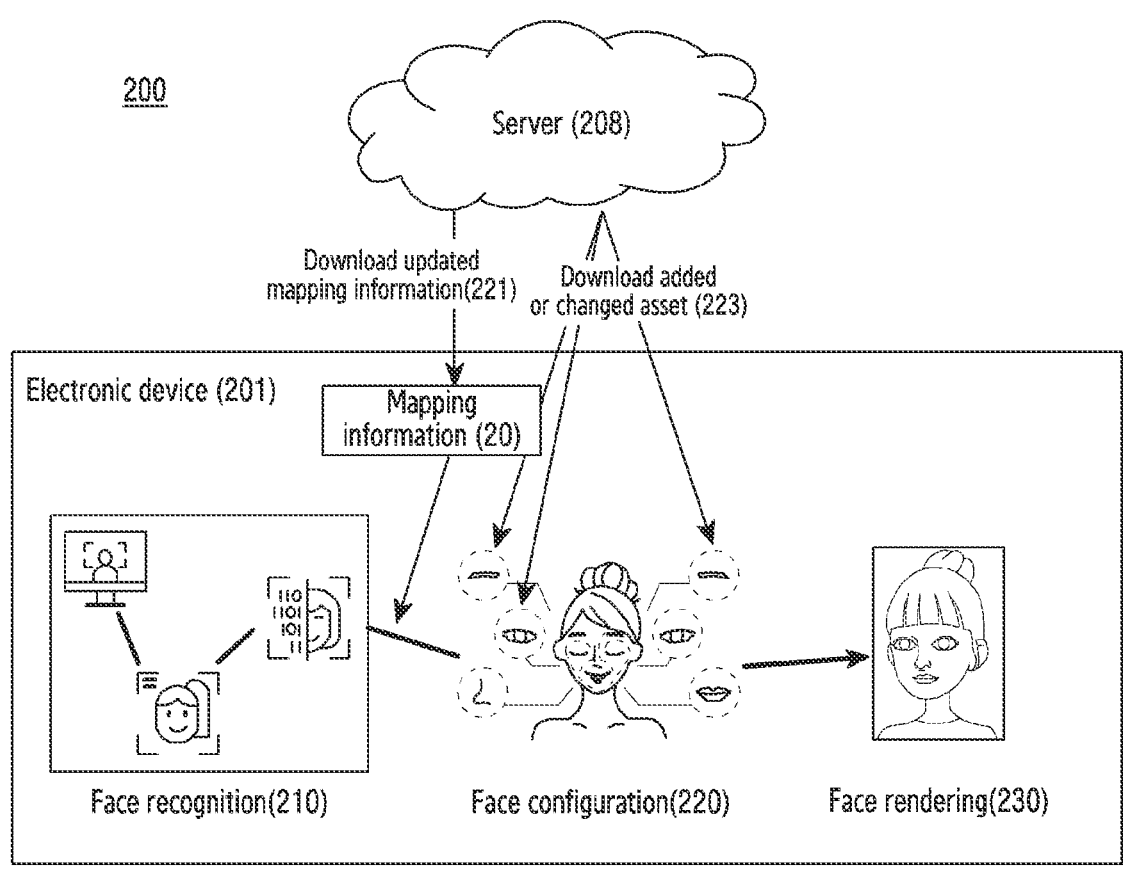
FIG. 2 illustrates a system for avatar generation of an electronic device according to various example embodiments.

FIG. 2 illustrates a system for avatar generation of an electronic device according to various example embodiments.

Referring to FIG. 2, a system 200 according to various example embodiments may include an electronic device 201 (e.g., the electronic device 101 of FIG. 1) and a server 208 (e.g., the server 108 of FIG. 1).

According to various embodiments, the electronic device 201 may include a function for avatar generation (or an avatar generating application). For example, the electronic device 201 may generate an avatar by recognizing a face of a person included in an image displayed on a display (e.g., the display module 160 of FIG. 1) (indicted by reference numeral 210), configuring (e.g., modeling) a face part of an avatar based on a result of the recognition (indicated by reference numeral 220), and rendering the configured face part (indicated by reference numeral 230). According to an embodiment, the electronic device may generate an avatar by further configuring body parts and/or clothes.

According to various embodiments, the electronic device 201 may analyze an image displayed on a display (e.g., the display module 160 of FIG. 1) (e.g., perform image processing) upon a request for avatar generation (e.g., execution of an avatar generation function) to extract feature information of a face region of an object (e.g., a person) included in the image and feature information of each component constituting the face (e.g., hairstyle, eyebrows, eyes, nose, mouth, beard, and/or accessories) so as to perform face recognition (indicated by reference numeral 210). The image may include an image (e.g., a preview image), which is acquired through a camera (e.g., the camera module 180 of FIG. 1) and being displayed on the display, or an image which is loaded from a memory (e.g., the memory 130 of FIG. 1) and displayed on the display. The face recognition (indicated by reference numeral 210) is understood by a person skilled in the art in the technical field of the disclosure, and thus a detailed description thereof will be omitted. According to an embodiment, the electronic device 201 may further perform body recognition and/or clothes recognition for extracting feature information related to a body and/or clothes.

According to various embodiments, the electronic device 201 may select a face base model and assets corresponding to respective components based on a recognition result (e.g., feature information of a face region and feature information of respective components), and arrange each of the selected assets in the selected face base model, so as to perform the face configuration 220. For example, the electronic device 201 may select a face base model based on a part of a recognition result (e.g., race, age, gender, and/or skin color) and select assets corresponding to respective components based on the other part thereof, and arrange each of the selected assets in the selected face base model to perform the face configuration (indicated by reference numeral 220).

According to various embodiments, the electronic device 201 may select a face base model and an asset by using mapping information 20 received (e.g., downloaded) from the server 208. The mapping information 20 may define how to configure the face of an avatar based on a result of the recognition of the image. The mapping information 20 may include a mapping table and assets. The mapping table may map feature information, which is related to a basic shape of a face, to a face base model and store the same, and may map feature information related to each component to assets and store the same. The asset may be data (e.g., a resource) for avatar generation. The mapping information 20 may be uploaded and/or updated by an operator of server 208 or a third party.

According to various embodiments, the electronic device 201 may identify whether the mapping information 20 is updated before constituting a face. For example, the electronic device 201 may transmit a version of the mapping information to the server 208 to identify whether the mapping information is updated and when an update is required, may download the mapping information 20 from the server 208 (indicated by reference numeral 221). According to an embodiment, the electronic device 201 may identify whether an asset needs to be added or changed in response to an update of the mapping table, and if necessary, may download the added or changed asset from the server 208 (indicated by reference numeral 223).

According to an embodiment, the electronic device 201 may perform body configuration based on feature information (e.g., race, age, skin color, and/or gender) (e.g., select a body base model mapped to feature information) extracted through face recognition. According to an embodiment, the electronic device 201 may perform body configuration based on a result of body recognition. According to another embodiment, the electronic device 201 may perform clothes configuration based on a result of face recognition and/or clothes recognition (e.g., select a clothes asset mapped to the recognition result).

According to various embodiments, the electronic device 201 may model an avatar by combining the configured face, body, and/or clothes, and may render the modeled avatar (indicated by reference numeral 230) to generate an avatar (e.g., a three-dimensional avatar).

According to various embodiments, the server 208 may manage the mapping information 20. For example, the server 208 may provide the electronic device 201 with the mapping information 20 uploaded and/or updated by an operator or a third party. According to an embodiment, the server 208 may provide the mapping information 20 by reflecting the characteristics of a user of the electronic device 201. For example, the server 208 may receive information regarding the user's characteristics (e.g., country information, a model name of the electronic device, event information, user account information, and/or avatar generation history information) from the electronic device 201, and may provide mapping information corresponding to the received information to the electronic device 201.

The system 200 according to an example embodiment described above may update only the mapping information 20 through the server 208, instead of updating the entire configuration to satisfy compatibility between the entire elements included in the electronic device 201 (e.g., the recognition module 231, the generation module 233, and the rendering module 235), so as to update the avatar generation function easily and quickly. In addition, the system 200 may provide a personalized (e.g., more suitable for a user) avatar generation function by providing the mapping information 20 by reflecting the user's characteristic information.

Figure 3A:
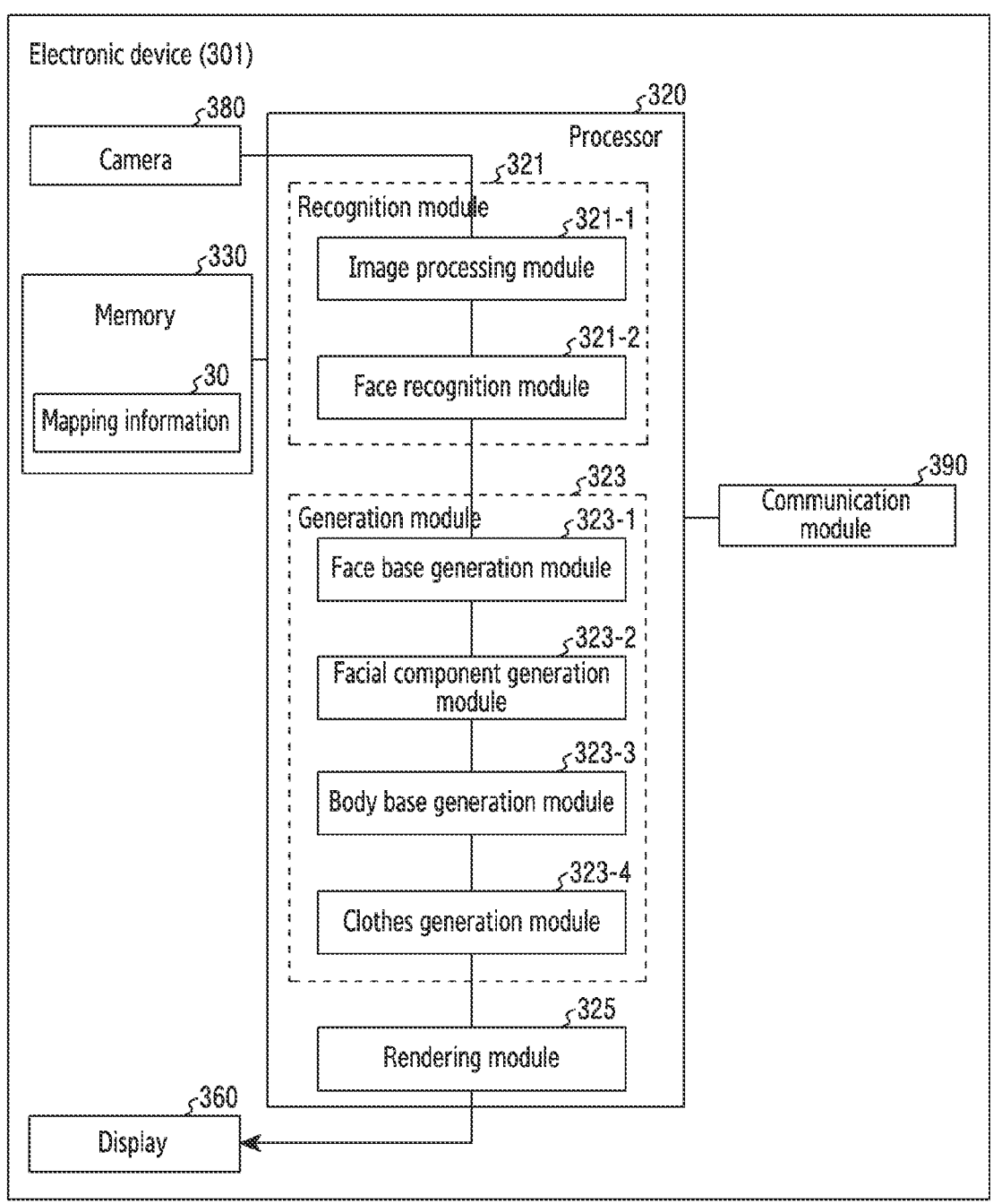
FIG. 3A is a block diagram of an electronic device according to an example embodiment.
Figure 3B:
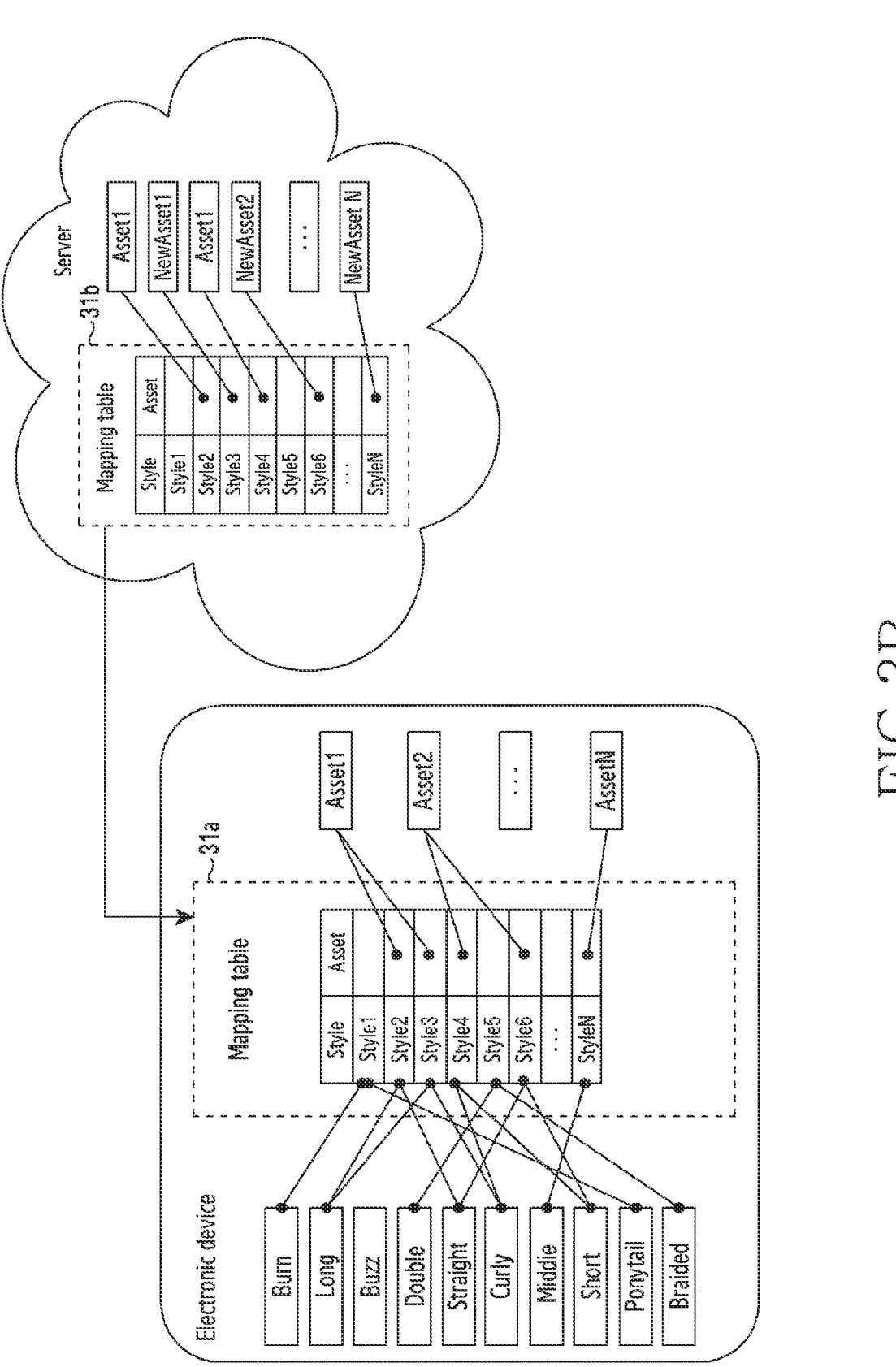
FIG. 3B illustrates an example of updating a mapping table according to an example embodiment.
Figure 3C:
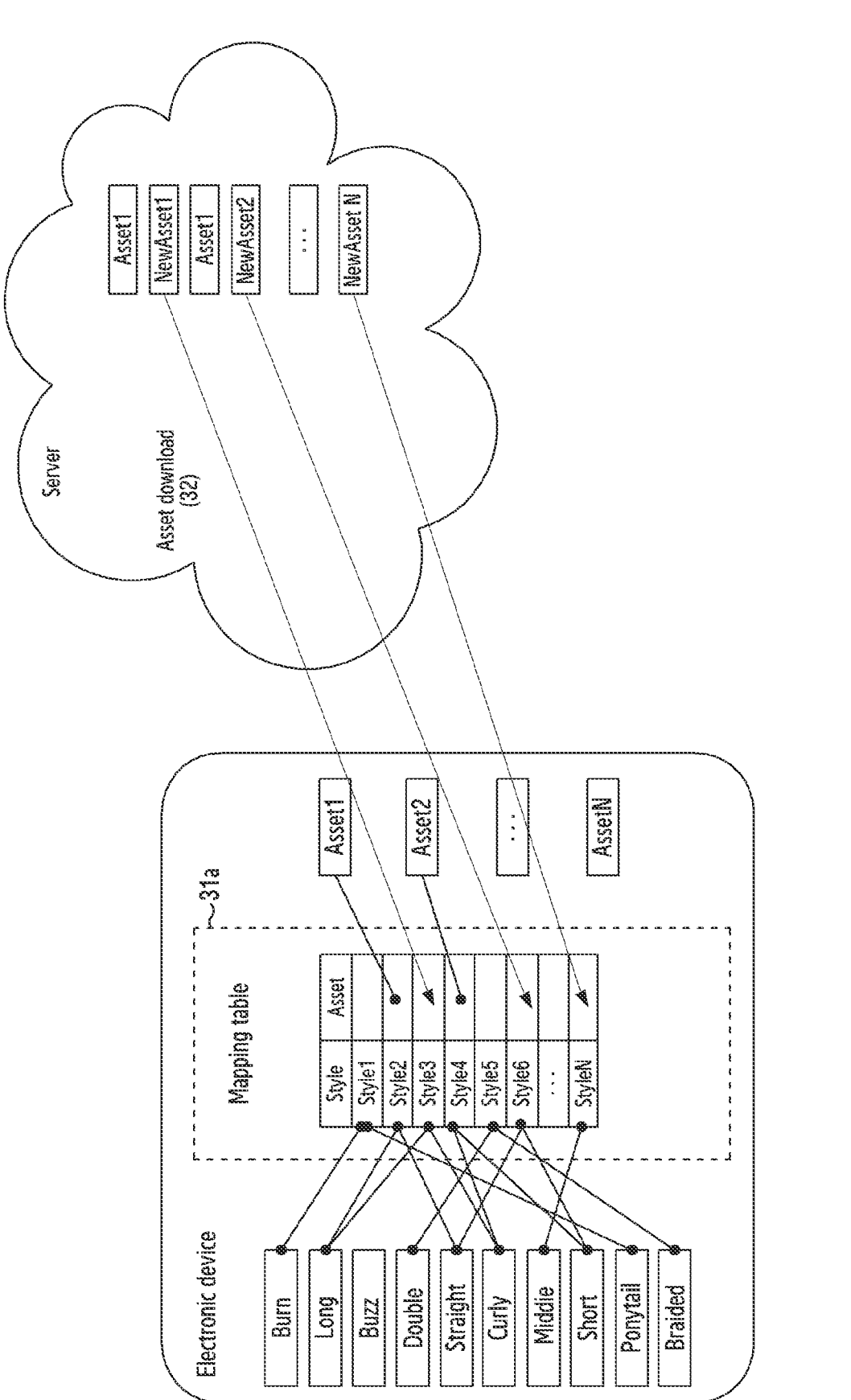
FIG. 3C illustrates another example of updating a mapping table according to an example embodiment.

FIG. 3A is a block diagram of an electronic device according to an example embodiment, FIG. 3B illustrates an example of updating a mapping table according to an example embodiment, and FIG. 3C illustrates another example of updating a mapping table according to an example embodiment.

Referring to FIGS. 3A to 3C, an electronic device 301 (e.g., the electronic device 101 of FIG. 1, the electronic device 201 of FIG. 2) according to an example embodiment may include a camera 380 (e.g., the camera module 180 of FIG. 1), a memory 330 (e.g., the memory 130 of FIG. 1), a display 360 (e.g., the display module 160 of FIG. 1), a processor 320 (e.g., the processor 120 of FIG. 1), or a communication module 390 (e.g., the communication module 190 of FIG. 1).

According to various embodiments, the camera 380 may capture an image of a subject (e.g., a user). For example, the camera 380 may be activated when an avatar generation function or a camera function is executed to capture an image of subject in response to a user input. The image acquired through the camera 380 may be displayed as a preview image on the display 360, or may be captured and stored in the memory 330. The preview image or the image stored in the memory 330 may be analyzed (e.g., face recognition, body recognition, and/or clothes recognition) by the processor 320 to generate an avatar.

According to various embodiments, the memory 330 may store an image (e.g., a photo). The image stored in the memory 330 may be analyzed (e.g., face recognition, body recognition, and/or clothes recognition) by the processor 320 to generate an avatar. According to an embodiment, the memory 330 may store mapping information 30 (e.g., the mapping information 20 of FIG. 2). Since the mapping information 30 is similar to the mapping information 20 of FIG. 2, a detailed description thereof will be omitted.

According to various embodiments, the display 360 may display an image including an object (e.g., a person, an animal, a plant, and/or a thing) for avatar generation. In addition, the display 360 may display an avatar generated through an avatar generation function (or application).

According to various embodiments, the processor 320 may control avatar generation. For example, the processor 320 may recognize an object (e.g., a person) from the image displayed on the display 360, configure the face, body, and/or clothes of an avatar based on a result of the recognition, and combine the face, body, and/or clothes and then render the same to generate an avatar. According to an embodiment, the processor 320 may include a recognition module 321, a generation module (or a configuration module) 323, and a rendering module 325.

According to various embodiments, the recognition module 321 may include an image processing module 321-1 and a face recognition module 321-2. The image processing module 321-1 may process the image displayed on the display 360 (e.g., detect a face region) and transmit the processed image to the face recognition module 321-2. The face recognition module 321-2 may recognize a face from the image processed by the image processing module 321-1. For example, the face recognition module 321-2 may extract feature information of the face region and feature information of each component constituting the face. According to an embodiment, the recognition module 321 may further include a body recognition module for extracting (recognizing) body feature information. According to another embodiment, the recognition module 321 may further include a clothes recognition module for recognizing clothes.

According to various embodiments, the generation module 323 may configure (generate) the face, body, and/or clothes of the avatar based on a result of the recognition of the recognition module 321. According to an embodiment, the generation module 323 may include a face base generation module 323-1, a facial component generation module 323-2, a body base generation module 323-3, and a clothes generation module 323-4.

According to various embodiments, the face base generation module 323-1 may generate a face base model based on the feature information (e.g., race, age, gender, and/or skin color) recognized by the recognition module 321. According to an embodiment, the face base generation module 323-1 may select a face base model mapped to the feature information recognized by the recognition module 321, based on the mapping information 30.

According to various embodiments, the facial component generation module 323-2 may generate a facial component based on the feature information of each component (e.g., hairstyle, eyebrows, eyes, nose, mouth, beard, and/or accessories) recognized by the recognition module 321. According to an embodiment, the facial component generation module 323-2 may select an asset mapped to the feature information of each recognized component, based on the mapping information 30.

According to various embodiments, the body base generation module 323-3 may generate (e.g., select) a body base model based on the feature information (e.g., age, gender, and/or race) recognized by the recognition module 321. According to an embodiment, the body base generation module 323-3 may, based on the mapping information 30, generate (e.g., select) a body base model mapped to body feature information (e.g., slim, fat, belly, broad shoulders, and/or narrow shoulders).

According to various embodiments, the clothes generation module 323-4 may generate clothes based on feature information of an object (e.g., a person) recognized by the recognition module 321. For example, the clothes generation module 323-4 may select a clothes asset based on the recognized user's age, gender, and/or race. According to an embodiment, the clothes generation module 323-4 may select a clothes asset based on the user's clothes taste and/or event (e.g., birthday, Halloween, Christmas). The clothes generation module 323-4 may analyze the photos registered in the user's social network periodically or aperiodically (e.g., upon the user's request) to identify the user's clothes taste. According to another embodiment, the clothes generation module 323-4 may select a clothes asset based on the type of clothes recognized by the recognition module 231.

According to various embodiments, the generation module 323 may identify whether the mapping information 30 is updated before generating a face part of an avatar (e.g., including a face base and facial components). For example, the generation module 323 may transmit, to a server (e.g., the server 108 in FIG. 1, the server 208 in FIG. 2), a version of a mapping table included in the mapping information 30 before generating the face part of the avatar, so as to identify whether the mapping table is updated. If an update is required as a result of the identification, the generation module 323 may download an updated mapping table from the server. For example, as shown in FIG. 3B, the generation module 323 may download an updated mapping table 31b from the server and update a mapping table 31a related to the hairstyle. Referring to the mapping tables 31a and 31b of FIG. 3B, in the case of a second hair style (long hair, straight) and a third hair style (long hair, curl), it may be seen that the second and the third hair styles have been mapped to a first asset before the update of mapping table, but the second hairstyle is mapped to the first asset and the third hairstyle is mapped to a new first asset after the update of mapping table. Similarly, in the case of a 4th hairstyle (curly, short) and a 6th hairstyle (straight, short), it may be seen that the 4th and 6th hairstyles have been mapped to a second asset before the update, but the fourth hairstyle is mapped to the second asset and the sixth hairstyle is mapped to a new second asset after the update. In other words, it may be seen that the assets for the third hairstyle and the sixth hairstyle have been added. As another example, in the case of an N-th hairstyle (middle), it may be seen that the N-th hairstyle has been mapped to an N-th asset before the update, but the N-th hairstyle is mapped to a new N-th asset after the update. In other words, it may be seen that the asset for the N-th hairstyle has been changed.

According to various embodiments, the generation module 323 may download the updated mapping table 31b and identify whether an asset needs to be downloaded based on the downloaded mapping table 31b. For example, as shown in FIG. 3C, the generation module 323 may identify whether added assets (e.g., new first asset and new second asset) or changed assets (e.g., new N-th asset) exist in the memory 330 and when the added asset or changed asset does not exist, may download the added or changed asset from a server (indicated by reference numeral 32). According to an embodiment, the electronic device 301 may not include the mapping table 31a, and the mapping table 31b may be stored in the server. The generation module 323 may transmit facial feature information and feature information of each component to the server, and may download a face base model and/or each asset corresponding to the feature information of a face and/or feature information of each component from the server.

Meanwhile, although FIGS. 3B and 3C have described the operation of updating the mapping table 31a of the electronic device 301 by using a hairstyle as an example, the mapping table 31a may include a face base model and other facial components (e.g., eyebrows, eyes, nose, mouth, ears, or accessories), and update the face base model and other facial components in a manner similar or identical to a hairstyle.

According to an embodiment, the generation module 323 may further transmit information regarding a user (hereinafter, referred to as characteristic information) to the server and receive mapping information 30 corresponding to the characteristic information. The characteristic information may include terminal information (e.g., a model name), country information, event information, avatar generation history information, and/or user account information. Accordingly, the electronic device 301 according to an example embodiment may provide mapping information more suitable for a user (e.g., provide a personalized avatar service) based on user characteristic information.

According to various embodiments, when the update of mapping information is completed or the mapping information does not need to be updated, the generation module 323 may model an avatar by combining a face part, a body part, and/or clothes.

According to various embodiments, the rendering module 325 may generate an avatar (e.g., a three-dimensional avatar) by rendering the avatar modeled by the generation module 323, and display the generated avatar on the display 360.

According to various embodiments, the communication module 390 may communicate with a server. For example, the communication module 390 may receive the mapping information 30 from the server. As another example, the communication module 390 may transmit the version of the mapping information 30 to the server. This transmission is to identify whether mapping information is updated. As another example, the communication module 390 may transmit user characteristic information (e.g., a country, a model name of an electronic device, avatar generation history information, account information, and an event) to the server, and may receive mapping information corresponding to the user characteristic information 30.

Meanwhile, in the above description, it has been described that the update of the mapping information 30 is performed when the avatar is generated by the generation module 323, but the update of the mapping information 30 is periodically or aperiodically performed by the processor 320 (or the avatar generation application). According to another example, the electronic device 301 may update the mapping information 30 based on reception of a notification notifying of the update of the mapping information 30 from the server.

Although, in FIG. 3, the recognition module 321, the generation module 323, and the rendering module 325 are illustrated and described as hardware-based modules included in the processor 320, at least a part of the recognition module 321, the generation module 323, and the rendering module 325 may be implemented as a software module stored in the memory 330. According to an embodiment, at least a part of the recognition module 321, the generation module 323, and the rendering module 325 may be included in the electronic device 301 as a separate hardware module. Similarly, the image processing module 321-1, the face recognition module 321-2, the face base generation module 323-1, the facial component generation module 323-2, the body base generation module 323-3, or the clothes generation module 323-4 may be implemented as a software module or hardware module. Hereinafter, the functions of the recognition module 321, the generation module 323, and the rendering module 325 will be described as operations of the processor 320.

Figure 4:
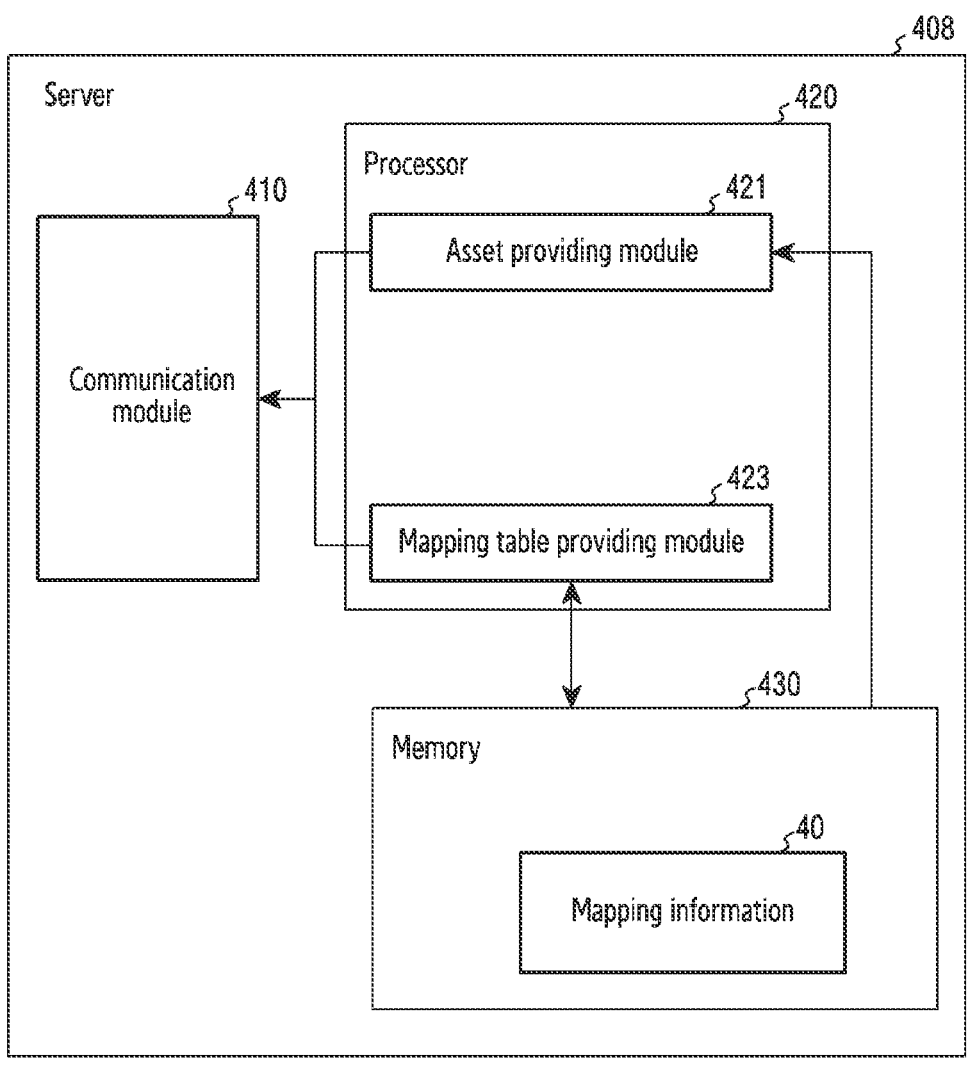
FIG. 4 is a block diagram of a server according to an example embodiment.

FIG. 4 is a block diagram of a server according to an example embodiment.

Referring to FIG. 4, a server 408 (e.g., the server 108 of FIG. 1, the server 208 of FIG. 2) according to an example embodiment may include a communication module 410, a processor 420, and a memory 430.

According to various embodiments, the memory 430 may store mapping information 40. The mapping information 40 may include a mapping table (e.g., the mapping table 31*b* of FIG. 3B) and assets. The mapping information 40 may be uploaded and updated by an operator of a server 408 or a third party. The operator or the third party may upload and/or update the mapping information 40 to the memory 430 through a manager service.

According to various embodiments, the communication module 410 may communicate with an electronic device (e.g., the electronic device 101 of FIG. 1, the electronic device 201 of FIG. 2, and the electronic device 301 of FIG. 3). For example, the communication module 410 may transmit the mapping information 40 to the electronic device under the control of the processor 420. According to an embodiment, the communication module 410 may receive a version of mapping information (e.g., mapping information 30) and/or user characteristic information stored in the electronic device from the electronic device, and may transmit updated mapping information to the electronic device based on the received version and/or user characteristic information under the control of the processor 420.

According to various embodiments, the processor 420 may control the operation of the server 408. For example, the processor 420 may control the operation of the server 408 to provide management of the mapping information 40, a browsing service, and/or an asset download service to the electronic device. According to an embodiment, the processor 420 may include an asset providing module 421 and a mapping table providing module 423.

According to various embodiments, the asset providing module 421 may provide an added or changed asset to the electronic device through the communication module 410. For example, the asset providing module 421 may provide assets requested by the electronic device (e.g., an asset that does not exist in the electronic device) to the electronic device through the communication module 410. The asset may include an asset related to a face base, an asset related to a facial component, an asset related to a body base, and/or an asset related to clothes.

According to various embodiments, the mapping table providing module 423 may provide the mapping table to the electronic device through the communication module 410. For example, the mapping table providing module 423 may receive a version of the mapping table and/or a user's characteristic information from the electronic device, identify whether the mapping table needs to be updated based on the received version of the mapping table and/or the user's characteristic information and, when an update is required, transmit the updated mapping table to the electronic device.

According to various embodiments, the mapping table providing module 423 may remap a mapping table (e.g., change an asset mapped to each feature information of the mapping table) based on the user's characteristic information to provide a personalized mapping table to the electronic device. For example, the mapping table providing module 423 may remap the mapping table to an asset compatible with the electronic device based on a model name of the electronic device, so as to provide a personalized mapping table to the electronic device. As another example, the mapping table providing module 423 may remap the mapping table to an asset specific to a corresponding country based on country information, so as to provide the personalized mapping table to the electronic device. As another example, the mapping table providing module 423 may remap the mapping table to an event-specific asset based on event information (e.g., birthday, Halloween, or Christmas), so as to provide the personalized mapping table to the electronic device. As another example, the mapping table providing module 423 may remap the mapping table to the user's preferred asset based on the avatar generation history or user account information, so as to provide the personalized mapping table to the electronic device.

Figure 5:
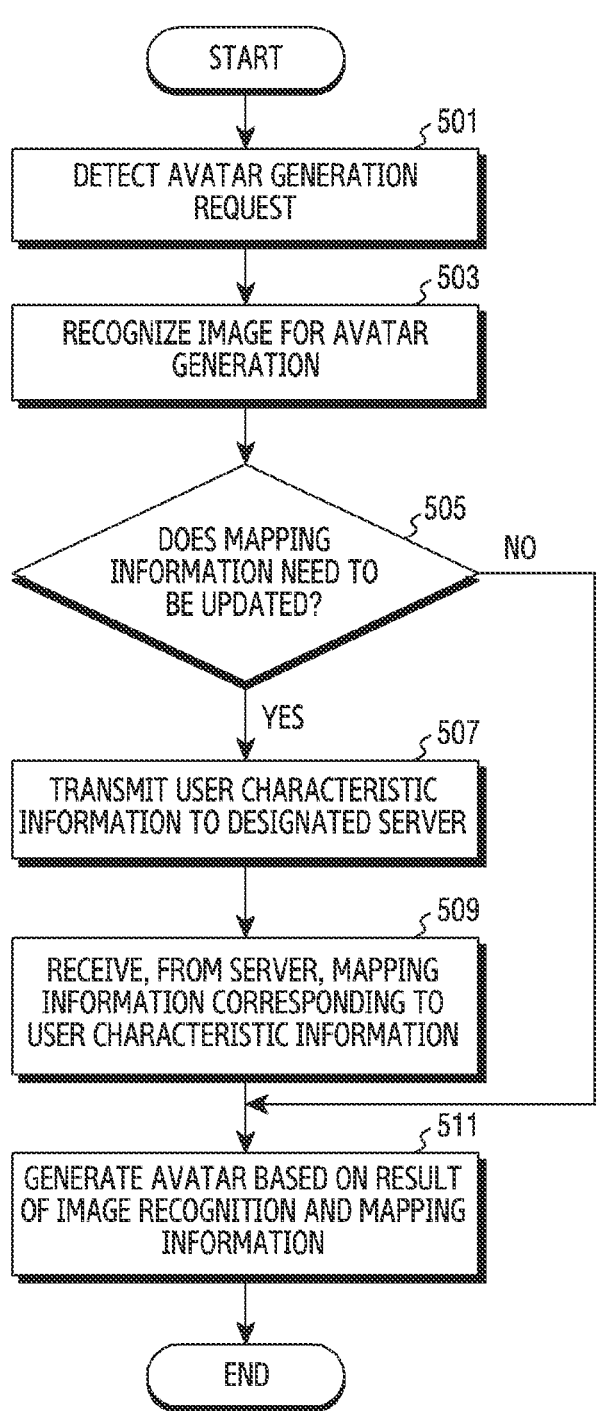
FIG. 5 is a flowchart illustrating a method for managing information for avatar generation by an electronic device according to an example embodiment.

FIG. 5 is a flowchart illustrating a method for managing information for avatar generation by an electronic device according to an example embodiment.

Referring to FIG. 5, a processor (e.g., the processor 120 of FIG. 1, the processor 320 of FIG. 3A) of an electronic device (e.g., the electronic device 101 of FIG. 1, the electronic device 201 of FIG. 2, and the electronic device 301 of FIG. 3A) according to an example embodiment may detect an avatar generation request in operation 501. For example, the processor may be configured to detect execution of an avatar generation function (or application).

According to various embodiments, the processor (or the recognition module 321 of FIG. 3A) may recognize an image for avatar generation in operation 503. The image may be a preview image obtained through a camera (e.g., the camera module 180 of FIG. 1, the camera 380 of FIG. 3A) or an image which is loaded (or read) from a memory (e.g., the memory 130 of FIG. 1, the memory 330 of FIG. 3A) and displayed on a display (e.g., the display module 160 of FIG. 1, the display 360 of FIG. 3A). Avatar generation may be requested in a state in which an image is displayed. According to an embodiment, the processor may be configured to activate a camera in response to a request for avatar generation to obtain a preview image, or load an image selected by a user from among images stored in the memory and display the image on the display.

According to an embodiment, the processor may be configured to recognize an object (e.g., a person) for avatar generation from an image, and may recognize (extract) feature information of a face of the recognized object and feature information related to each component configuring the face (e.g., hair style, eyebrows, eyes, nose, mouth, beard, or accessories). The feature information of the face may include skin color, race, gender, age, or appearance (e.g., oval, square, or round). Feature information related to the hairstyle may include curly hair, long hair, short hair, medium hair, straight, or wavy hair, and feature information related to eyebrows includes straight eyebrows, thin eyebrows, thick eyebrows, and sagging eyebrows. Feature information related to eyes may include double eyelids, single eyelids, and drooping eyes, and feature information related to nose may include a low nose, a broad nose, a short nose, and a long nose. Feature information related to a mouth may include a protruding mouth, a small mouth, and a large mouth, feature information related to a beard may include no beard, a mustache, a beard, a long beard, and a short beard, and the accessory may include glasses, earrings, a nose ring, and a color lens. The feature information related to each component described above is only an example and does not limit the disclosure.

According to an embodiment, the processor may be configured to recognize (extract) feature information related to the body and/or clothes of an object included in an image.

According to various embodiments, in operation 505, the processor (or the generation module 323 of FIG. 3A) may identify whether mapping information (e.g., the mapping information 20 of FIG. 2, the mapping information 30 of FIG. 3A) needs to be updated. For example, the processor may be configured to transmit the version of a mapping table (e.g., the mapping table 31a in FIG. 3B) to a designated server (e.g., the server 208 in FIG. 1, server 208 in FIG. 2, the server 408 in FIG. 4).) to identify whether the mapping table is updated.

In case that the update is not required as a result of the identification of operation 505, the processor may be configured to proceed to operation 511, which will be described later. On the other hand, when the update is required as a result of identification of operation 505, the processor may be configured to transmit user characteristic information to a designated server in operation 507. The user characteristic information may include a model name of the electronic device, country information, event information, avatar generation history information, and/or user account information.

According to various embodiments, the processor (or the generation module 323 of FIG. 3A) may receive mapping information corresponding to the user's characteristic information from the server in operation 509. For example, the processor may be configured to receive the latest mapping table from the server and update the mapping table stored in the memory. In addition, the processor may be configured to identify whether an asset to be downloaded exists based on the updated mapping table, and in case that there is an asset to be downloaded, the processor may be configured to download and store the asset from the server.

According to various embodiments, the processor (e.g., the generation module 323 and the rendering module 325 of FIG. 3A) may generate an avatar based on the image recognition result and mapping information in operation 511. For example, the processor (e.g., the generation module 323 of FIG. 3A) may select a face base based on facial feature information, select an asset corresponding to each component based on the feature information of each component, and configure the face part by arranging the selected asset on the selected face base. Similarly, the processor (e.g., the generation module 323 of FIG. 3A) may configure body parts and/or clothes. The processor (e.g., the generation module 323 of FIG. 3A) may model the avatar by combining the configured face part, body part, and clothes. The processor (e.g., the rendering module 325 of FIG. 3A) may generate the avatar by rendering the modeled avatar.

According to an embodiment, the processor may be configured to identify whether the mapping information is updated periodically or aperiodically, even when the avatar is not generated. According to another embodiment, the processor may be configured to update the mapping information upon receiving an alarm notifying of the update of the mapping information from the server.

According to an embodiment, the mapping table may be stored in the server instead of being stored in the electronic device. In this case, operation 505 is omitted, and operation 507 may correspond to an operation in which the processor transmits feature information of a face and/or feature information of each component and the user's characteristic information to the server through the communication module. Operation 509 may correspond to an operation in which the processor receives a face base model and/or each asset from the server through the communication module. Operation 511 may be an operation of generating an avatar based on the received face base model and/or each asset.

Figure 6:
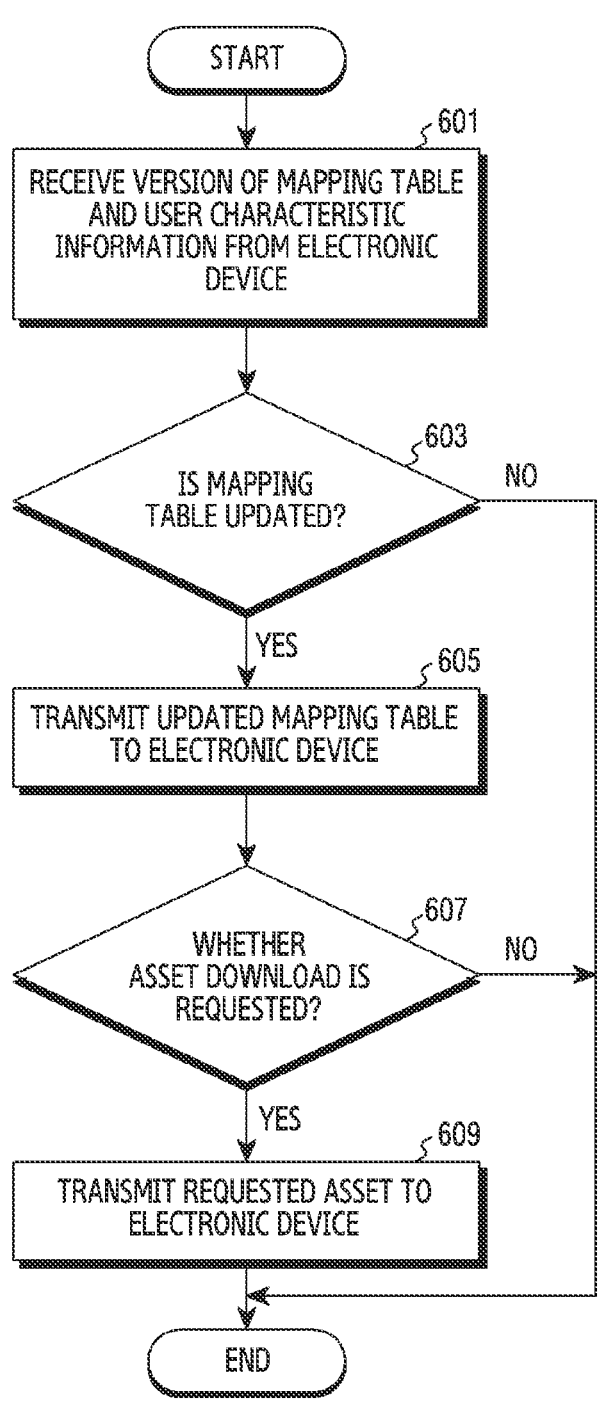
FIG. 6 is a flowchart illustrating a method for managing information for avatar generation by a server according to an example embodiment.

FIG. 6 is a flowchart illustrating a method for managing information for avatar generation by a server according to an example embodiment.

Referring to FIG. 6, a processor (e.g., the processor 420 in FIG. 4) of a server (e.g., the server 108 of FIG. 1, the server 208 of FIG. 2, the server 408 of FIG. 4) according to an example embodiment may receive a version of a mapping table (e.g., the mapping table 31*a* of FIG. 3B) and/or user characteristic information from an electronic device (e.g., the electronic device 101 of FIG. 1, the electronic device 201 of FIG. 2, the electronic device 301 of FIG. 3A) through a communication module (e.g., the communication module 410 of FIG. 4) in operation 601. For example, the processor may be configured to receive version information of the mapping table and user characteristic information together through the communication module. As another example, when a mapping table reflecting user characteristics is not provided, the processor may be configured to receive a version of the mapping table included in the electronic device through the communication module. As another example, as described with reference to FIG. 5, after receiving the version of the mapping table, when an update of the mapping table is required, the processor may be configured to receive user characteristic information. As another example, after transmitting an alarm notifying of an update of the mapping table to the electronic device, the processor may be configured to receive user characteristic information through the communication module. Hereinafter, a case in which the processor receives both the version of the mapping table and the user's characteristic information will be described as an example.

According to various embodiments, in operation 603, the processor may be configured to identify whether the mapping table has been updated. For example, the processor may be configured to compare a version of a mapping table (e.g., the mapping table 31*b* of FIG. 3B) stored in a memory (e.g., the memory 430 of FIG. 4) with a version of a received mapping table (e.g., the mapping table 31*a* of FIG. 3B), so as to identify whether the mapping table has been updated.

As a result of the identification of operation 603, in case that the mapping table is not updated, the processor may be configured to end a mapping table update procedure. According to an embodiment, the processor may be configured to transmit a response indicating that the update is unnecessary to the electronic device through the communication module.

As a result of the identification of operation 603, in case that the mapping table is updated, the processor may be configured to transmit the updated mapping table to the electronic device in operation 605. The updated mapping table may be updated (or remapped) by reflecting user characteristic information.

According to various embodiments, in operation 607, the processor may be configured to identify whether an asset download is requested. The asset requested to be downloaded may be an asset that is added or changed due to an update of the mapping table and does not exist in the electronic device.

As a result of the identification of operation 607, in case that the download of the asset is not requested, the processor may be configured to end the mapping table update procedure. As a result of the identification of operation 607, when a download of an asset is requested, the processor may be configured to transmit the requested asset to the electronic device in operation 609.

According to an embodiment, the mapping table may be stored in the server instead of being stored in the electronic device. In this case, operations 601 and 603 may correspond to an operation of receiving feature information of a face and/or feature information of each component and the user's characteristic information from the electronic device. Operation 605 may correspond to an operation of transmitting information related to the face base model and/or each asset selected based on the received feature information and/or the characteristic information. The electronic device may identify whether at least one asset that needs to be downloaded (e.g., an asset that is not stored in the electronic device) exists based on the information, and may request a server to download the at least one asset that needs to be downloaded.

According to various example embodiments, an electronic device (e.g., the electronic device 101 of FIG. 1, the electronic device 201 of FIG. 2, and the electronic device 301 of FIG. 3A) may include a communication module (e.g., the communication module 190 of FIG. 1, the communication module 390 of FIG. 3A), a display (e.g., the display module 160 of FIG. 1, the display 360 of FIG. 3A), a memory (e.g., the memory 130 of FIG. 1, the memory 330 of FIG. 3A) configured to store mapping information (e.g., the mapping information 20 of FIG. 2, the mapping information 30 of FIG. 3A) for avatar generation, and at least one processor (e.g., processor 120 of FIG. 1, processor 320 of FIG. 3A) operatively connected, directly or indirectly, to the communication module, the display, and the memory, wherein the at least one processor is configured to, in response to an avatar generation request, recognize an image displayed on the display, and generate an avatar based on a result of the recognition of the image and the mapping information, and wherein the at least one processor is configured to, in case that the mapping information needs to be updated, transmit characteristic information regarding a user of the electronic device to a designated server (e.g., the server 108 of FIG. 1, the server 208 of FIG. 2, the server 408 of FIG. 4) through the communication module, and receive, from the server, mapping information corresponding to the characteristic information regarding the user.

According to various embodiments, the characteristic information may include at least one of a model name of the electronic device, account information of the user, country information, event information, and avatar generation history information.

According to various embodiments, the at least one processor may be configured to select a face base model based on the feature information regarding a face of an object included in the image, select assets corresponding to facial components configuring the face, respectively, and configure a face part of the avatar by arranging the selected asset in the selected face base model.

According to various embodiments, the mapping information may include a mapping table (e.g., the mapping table 31*a* of FIGS. 3B and 3C), in which feature information of an object is mapped to an asset, and the asset.

According to various embodiments, the at least one processor may be configured to identify through the server whether the mapping table is updated before generating the avatar, and in case that the mapping table is updated, download the updated mapping table (e.g., the mapping table 31*b* of FIG. 3B) from the server and store the updated mapping table in the memory.

According to various embodiments, the at least one processor may be configured to, based on the updated mapping table, identify whether at least one asset that needs to be downloaded exists, and download the at least one asset that needs to be downloaded from the server and store the downloaded asset in the memory.

According to various embodiments, the at least one processor may be configured to recognize the displayed image by extracting feature information of a face of an object included in the image and feature information of each component constituting the face.

According to various embodiments, the at least one processor may be configured to periodically or aperiodically identify whether the mapping information is updated.

According to various example embodiments, a method for managing information for avatar generation by an electronic device (e.g., the electronic device 101 of FIG. 1, the electronic device 201 of FIG. 2, the electronic device 301 of FIG. 3A) may include recognizing an image displayed on a display (e.g., the display module 160 of FIG. 1, the display 360 of FIG. 3A) in response to a request for avatar generation, identifying whether mapping information for the avatar generation (e.g., the mapping information 20 of FIG. 2, the mapping information 30 of FIG. 3A) needs to be updated, transmitting characteristic information regarding a user of the electronic device to a designated server (e.g., the server of FIG. 1, the server 208 of FIG. 2, the server 408 of FIG. 4) in case that the mapping information needs to be updated, receiving, from the server, updated mapping information corresponding to the characteristic information regarding the user, and generating an avatar based on a result of the recognition of the image and the updated mapping information.

According to various embodiments, the characteristic information may include at least one of a model name of the electronic device, account information of the user, country information, event information, and avatar generation history information.

According to various embodiments, the generating of the avatar may include selecting a face base model based on the feature information regarding a face of an object included in the image, selecting assets corresponding to facial components configuring the face, respectively, and configuring a face part of the avatar by arranging the selected asset in the selected face base model.

According to various embodiments, the mapping information may include a mapping table (e.g., the mapping table 31*a* of FIGS. 3B and 3C), in which feature information of an object is mapped to an asset, and the asset.

According to various embodiments, the receiving of the mapping information may include identifying whether at least one asset that needs to be downloaded exists, based on the mapping table, and downloading the at least one asset that needs to be downloaded from the server and storing the downloaded asset in the memory (e.g., the memory 130 of FIG. 1, the memory 330 of FIG. 3A).

According to various embodiments, the recognizing of the displayed image may include extracting feature information of a face of an object included in the image and feature information of each component constituting the face.

According to various example embodiments, the method may further include identifying periodically or aperiodically whether the mapping information is updated.

According to various example embodiments, an electronic device (e.g., the server 108 of FIG. 1, the server 208 of FIG. 2, the server 408 of FIG. 4) may include a communication module (e.g., the communication module of FIG. 4), a memory (e.g., the memory 430 of FIG. 4) configured to store mapping information (e.g., the mapping information 40 of FIG. 4) including a mapping table (the mapping table 31*b* of FIG. 3B), in which feature information of an object is mapped to an asset, and the asset, and at least one processor (e.g., the processor 420 of FIG. 4) operatively connected to the communication module and the memory, wherein the least one processor is configured to receive at least one of a version of a mapping table (e.g., the mapping table 31*a* of FIGS. 3B and 3C) included in an external electronic device (e.g., the electronic device 101 of FIG. 1, the electronic device 201 of FIG. 2, the electronic device 301 of FIG. 3A) or characteristic information of a user of the external electronic device through the communication module, identify whether the mapping table included in the external electronic device is updated, based on at least one of the received mapping table version or the user characteristic information, and in case that the mapping table included in the external electronic device needs to be updated, transmit an updated mapping table to the external electronic device. "Based on" as used herein covers based at least on.

According to various embodiments, the characteristic information may include at least one of a model name of the electronic device, account information of the user, country information, event information, and avatar generation history information.

According to various embodiments, the at least one processor may be configured to, in case that download of at least one asset is requested from the external electronic device, transmit the requested at least one asset to the external electronic device through the communication module.

According to various embodiments, the at least one processor may be configured to, based on the user characteristic information, perform remapping of the asset, having been mapped to the feature information of the object, and transmit the remapped mapping table to the external electronic device.

According to various embodiments, the at least one processor may be configured to, in case that the mapping information is updated, notify the update of the mapping information to the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a communication module comprising communication circuitry;
a display;
a camera;
memory storing executable instructions and mapping information for avatar generation, wherein the mapping information comprises first mapping information corresponding to first feature information related to a face of an object and second mapping information corresponding to second feature information related to components constituting the face, wherein the mapping information includes information representing mapping relationship related to the first feature information and the second feature information which are mapped with graphical data for generating an avatar; and
at least one processor comprising processing circuitry,
wherein the instructions, when executed individually and/or collectively by the least one processor, cause the electronic device to:
in response to an avatar generation request, recognize an image displayed on the display by acquiring third feature information related to a face region of an object in the image and fourth feature information related to components constituting the face region; and
generate an avatar based on the first mapping information corresponding to the third feature information and the second mapping information corresponding to the fourth feature information, and
wherein the at least one processor is further configured to:
identify whether a current version of the mapping information is a latest version; and
in a case that the current version of the mapping information is not the latest version:
transmit characteristic information regarding a user of the electronic device to a designated server;
receive, from the designated server, the latest version of the mapping information corresponding to the characteristic information, wherein the characteristic information comprises identification information associated with at least one of the electronic device or the user and includes a model name of the electronic device, account information of the user, and avatar generation history information;
identify at least a portion of graphical data related to the image to be updated, based on a result of the recognition of the image and the latest version of mapping information, wherein the at least a portion of graphical data is used to generate an avatar related to the image;
receive, from the designated server, the latest version of graphical data corresponding to the at least a portion of the graphical data; and generate the avatar based on at least the latest version of the graphical data.

2. The electronic device of claim 1, wherein the characteristic information further comprises country information; or event information.

3. The electronic device of claim 1, wherein the instructions, when executed by the at least one processor, cause the electronic device to:

select a face base model based on the first feature information regarding the face region of the object included in the image;

select graphical data corresponding to facial components configuring the face region, respectively; and configure a face part of the avatar at least by arranging the selected graphical data in the selected face base model.

4. The electronic device of claim 1, wherein the instructions, when executed by the at least one processor, cause the electronic device to periodically and/or aperiodically identify whether the mapping information is updated.

5. The electronic device of claim 4, wherein the instructions, when executed by the at least one processor, cause the electronic device to:

before generating the avatar, identify through the designated server whether the mapping information is updated;

in case that the mapping information is updated, download the latest version of the mapping information from the designated server and store the latest version of the mapping information in the memory;

based on the latest version of the mapping information, identify whether at least a portion of the latest version of graphical data to be downloaded exists; and download the at least a portion of the latest version of graphical data to be downloaded from the designated server and store the downloaded portion of the latest version of graphical data in the memory.

6. The electronic device of claim 1, wherein the characteristic information further comprises country information, and event information.

7. A method of an electronic device, the method comprising:

based on a request for avatar generation, recognizing an image displayed on a display, wherein mapping information stored in memory of the electronic device comprises first mapping information corresponding to first feature information related to a face of an object and second mapping information corresponding to second feature information related to components constituting the face, wherein the mapping information includes information representing mapping relationship related to the first feature information and the second feature information which are mapped with graphical data for generating an avatar, and wherein the image is recognized by acquiring third feature information related to a face region of an object in the image and fourth feature information related to components constituting the face region;

generating an avatar based on the first mapping information corresponding to the first feature information and the second mapping information corresponding to the fourth feature information, and wherein the method further comprising:

identifying whether a current version of the mapping information is a latest version;

in case that the current version of the mapping information is not the latest version:

transmitting characteristic information regarding a user of the electronic device to a designated server;

receiving, from the designated server, the latest version of mapping information corresponding to the characteristic information, wherein the characteristic information comprises identification information associated with at least one of the electronic device or the user and includes a model name of the electronic device, account information of the user, and avatar generation history information;

identifying at least a portion of graphical data related to the image to be updated, based on a result of the recognition of the image and the latest version of mapping information;

receiving, from the designated server, the latest version of graphical data corresponding to the at least a portion of the graphical data; and generating the avatar based on at least the latest version of the graphical data.

8. The method of claim 7, wherein the characteristic information further comprises country information, or event information.

9. The method of claim 7, wherein the recognizing of the displayed image comprises extracting feature information of a face of an object included in the image and feature information of components constituting the face, and wherein the generating of the avatar comprises:

selecting a face base model based on the first feature information regarding the face region of the object included in the image;

selecting graphical data corresponding to facial components configuring the face region, respectively; and configuring a face part of the avatar by arranging the selected graphical data in the selected face base model.

10. The method of claim 7, wherein the identifying of whether a current version of the mapping information is the latest version comprises identifying periodically and/or aperiodically whether the mapping information is updated.

11. The method of claim 10, wherein receiving the latest version of graphical data comprises:

based on the latest version of the mapping information, identifying whether at least a portion of the latest version of graphical data to be downloaded exists; and downloading the at least a portion of the latest version of graphical data to be downloaded from the designated server and storing the downloaded portion of the latest version of graphical data in the memory.

* * * * *